US012033819B2

(12) United States Patent
Ehrlich et al.

(10) Patent No.: US 12,033,819 B2
(45) Date of Patent: Jul. 9, 2024

(54) SWITCHGEAR

(71) Applicant: Siemens Energy Global GmbH & Co. KG, Munich (DE)

(72) Inventors: Frank Ehrlich, Hohen Neuendorf (DE); Rico Rademacher, Ludwigsfelde (DE); Ingolf Reiher, Berlin (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 152 days.

(21) Appl. No.: 17/624,626

(22) PCT Filed: Jun. 10, 2020

(86) PCT No.: PCT/EP2020/066034
§ 371 (c)(1),
(2) Date: Jan. 4, 2022

(87) PCT Pub. No.: WO2021/001125
PCT Pub. Date: Jan. 7, 2021

(65) Prior Publication Data

US 2022/0254586 A1 Aug. 11, 2022

(30) Foreign Application Priority Data

Jul. 4, 2019 (DE) ..................... 10 2019 209 871.1

(51) Int. Cl.
*H01H 33/662* (2006.01)
*H01H 33/02* (2006.01)
*H01H 33/666* (2006.01)

(52) U.S. Cl.
CPC .... *H01H 33/66207* (2013.01); *H01H 33/666* (2013.01); *H01H 2033/024* (2013.01); *H01H 33/66238* (2013.01)

(58) Field of Classification Search
CPC ........... H01H 33/66207; H01H 33/666; H01H 33/66238; H01H 33/022; H01H 33/664; H01H 2033/024; H01H 2033/66246; H01H 2033/66223; H01H 1/50; H01H 3/32; H01H 9/04
USPC ................. 218/118, 134, 137–140, 135–155
See application file for complete search history.

(56) References Cited

U.S. PATENT DOCUMENTS

| | | | | |
|---|---|---|---|---|
| 3,670,123 | A | 6/1972 | Luehring | |
| 3,671,023 | A | 6/1972 | Seil | |
| 6,884,940 | B1 * | 4/2005 | Utsumi | H01H 33/6661 218/136 |
| 7,679,023 | B2 * | 3/2010 | Sato | H01H 33/24 218/155 |

(Continued)

FOREIGN PATENT DOCUMENTS

| | | | |
|---|---|---|---|
| DE | 8109229 | U1 | 8/1981 |
| DE | 9320460 | U1 | 8/1994 |

(Continued)

*Primary Examiner* — William A Bolton
(74) *Attorney, Agent, or Firm* — Laurence A. Greenberg; Werner H. Stermer; Ralph E. Locher

(57) ABSTRACT

An electrical switchgear has a first switching contact piece and a second switching contact piece. The two switching contact pieces can be moved relative to one another by way of a kinematic chain. The kinematic chain has an axially movable drive element, which is guided in a guide element. A first pin is guided in a first gate and defines the trajectory of the drive element in the guide element.

13 Claims, 3 Drawing Sheets

(56) References Cited

U.S. PATENT DOCUMENTS

| | | | | |
|---|---|---|---|---|
| 8,035,054 | B2 * | 10/2011 | Ozawa | H02B 13/01 218/55 |
| 8,168,909 | B2 * | 5/2012 | Kobayashi | H01H 33/6606 218/43 |
| 8,426,759 | B2 * | 4/2013 | Nagatake | H01H 1/50 218/120 |
| 8,471,166 | B1 | 6/2013 | Glaser | |
| 9,659,729 | B2 | 5/2017 | Bartz et al. | |
| 10,553,377 | B2 | 2/2020 | Binner et al. | |
| 10,650,994 | B2 * | 5/2020 | Bauer | H01H 33/42 |
| 2007/0228014 | A1 * | 10/2007 | Tsuchiya | H01H 33/66207 218/118 |
| 2010/0089874 | A1 * | 4/2010 | Morita | H01H 9/22 218/154 |
| 2016/0254110 | A1 | 9/2016 | Bartz et al. | |
| 2020/0388455 | A1 | 12/2020 | Ehrlich et al. | |

FOREIGN PATENT DOCUMENTS

| | | | |
|---|---|---|---|
| DE | 102004009527 | A1 | 9/2005 |
| DE | 102013221910 | A1 | 4/2015 |
| DE | 102017206754 | A1 | 10/2018 |
| EP | 3093862 | A1 | 11/2016 |
| JP | S4617874 | Y1 | 6/1971 |
| JP | 2000501234 | A | 2/2000 |
| JP | 2000123456 | A | 4/2000 |
| JP | 2004241373 | A | 8/2004 |
| JP | 2012048868 | A | 3/2012 |
| WO | WO 2015062786 | A1 | 5/2015 |

* cited by examiner

SWITCHGEAR

FIELD AND BACKGROUND OF THE INVENTION

The invention relates to a switchgear, comprising a first switching contact piece, which can be moved relative to a second switching contact piece via a kinematic chain, wherein the kinematic chain comprises an axially displaceable drive element, which is guided on a guide element.

A switchgear is known for example from the international publication WO 2015/062786 A1. In this, a first switching contact piece of the switchgear can be moved relative to a second switching contact piece of the switchgear. A kinematic chain is used to generate the relative movement, wherein the kinematic chain comprises an axially displaceable drive element, which is guided on a guide element. A disk-shaped drive element is provided therein, which is guided within a sleeve. Although such a configuration of a switchgear is advantageous in that the drive element is arranged such that it is mechanically protected in the interior of the sleeve which guides it, repeated relative movements may result in asymmetrical wear whereby an increase in the friction forces between the drive element and sleeve may occur to the point of jamming.

SUMMARY OF THE INVENTION

The resultant object of the invention is therefore to specify a switchgear which also enables reliable guidance of a drive element on a guide element after multiple relative movements of switching contact pieces.

In accordance with the object, the object is achieved in a switchgear of the type mentioned at the outset in that a first pin in a first gate of the guide element determines the movement path of the drive element.

A switchgear serves for switching a phase conductor. To this end, the impedance of the phase conductor can be altered. This can preferably take place by means of a relative movement between a first switching contact piece and a second switching contact piece. To energize the switchgear, i.e. to interconnect the phase conductor, the switching contact pieces are moved toward one another and brought into galvanic contact. To de-energize the switchgear, i.e. to interrupt the phase conductor, the switching contacts which were until then in galvanic contact, are moved away from one another and a switching path is formed between the switching contact pieces.

In this case, the switching contact pieces can lie within a hermetically closed space, so that an enclosed atmosphere flows around the switching contact pieces. The atmosphere can be for example a fluid, which is subject to overpressure or underpressure in relation to the environment of the switchgear. The fluid can preferably be in a gaseous state. To this end, for example, fluorine-containing substances such as sulfur hexafluoride, fluoronitrile, fluoroolefin, fluoroketone etc. can be used. However, nitrogen and nitrogen-based mixtures are also suitable for use as an electrically insulating fluid. If required, the switching contact pieces can be under a vacuum, so that the number of free charge carriers in the region of the switching contact pieces is reduced. By way of example, a corresponding vacuum switching tube can be used, which can comprise switching contact pieces which extend within the vacuum and butt against one another in an axially opposed manner. To delimit the vacuum, a so-called tube body can be used, through the walls of which contact elements (shafts) are guided for the contacting of the switching contact pieces.

A relative movement of the switching contact pieces can be realized using a drive device. A kinematic chain can be used to transfer movement of a drive device to the mutually relatively movable switching contact pieces. The kinematic chain can comprise different transmission elements. In this regard, for example, switching rods, pivot levers, cross-arms, gears etc. can be incorporated in the kinematic chain in order to generate a relative movement between the two switching contact pieces. If required, it may be provided that only one of the switching contact pieces can be driven, whereas the other switching contact piece is in a stationary position. However, it may also be provided that both switching contact pieces can be moved in order to trigger a mutual relative movement of the switching contact pieces.

A guide element can be used to realize the guidance and direction of the drive element. In this case, the drive element can preferably be connected to a movable switching contact piece at a rigid angle, so that both the drive element and the switching contact piece can be stabilized via the guide element. The drive element, in the manner of a piston, can preferably be guided on the guide element. The guide element can be designed in the manner of a cylinder, wherein the drive element and the guide element are arranged to be mutually relatively displaceable. A pin can be arranged on the lateral surface of the piston, in particular at a rigid angle. A movement path of the drive element can be determined by means of a pin, which slides in a gate. By way of example, the movement path of the drive element can be determined in an axial manner; however, if required, this axial movement can also be superimposed with a rotation. This can be defined for example by the progression of the gate. However, the gate is preferably formed in such a way that the first pin slides along linearly in the gate. In this case, the pin should comprise a plurality of contact points in the gate so that the pin is prevented from tilting in the gate. The gate can preferably be formed in the manner of a groove or slot, wherein the flanks of the groove or the flanks of the slot are scanned by the pin (sliding block) and positive guidance of the pin along with the guided displaceable drive elements is enforced. A suitable guide element is, for example, a cylinder, in which case the axial movement of the drive element runs parallel to the cylinder axis. Suitable cylinders are, for example, hollow cylinders with a varying cross-sectional form; for example, the guide element can be a hollow cylinder with an annular cross-section. However, it may also be provided that the hollow cylinder has, for example, a U profile or an L profile. Irrespective of the form of the guide element, the gate can preferably be formed in the manner of an opening in a wall of the guide element. It is thus possible to provide the delimiting flanks of the gate for contact with the pin.

The drive element can be connected for example to an elastically deformable wall portion. A particular movement profile can be defined via the gate and the pin, as a consequence of which a particular elastic deformation of the elastically deformable wall can be generated. The service life of the fluid-tight wall can thus be increased.

A further advantageous configuration can provide that a second pin and a second gate are arranged diametrically opposite the first pin and the first gate with respect to the drive element.

The use of a first pin and a first gate and a second pin and a second gate enables forces to be distributed as parallel as possible to the displacement axis of the drive element.

Tilting and therefore wear of a gate and a pin is therefore additionally counteracted. In particular, when providing a superimposition of the axial movement of the drive element with a rotative component, for example, a uniform, symmetrical guidance of the drive element and a switching contact piece rigidly coupled to the drive element can therefore be performed. When using a plurality of pins, the pins should be designed to be identical so that they are guided in the same manner in the respective gate.

It may advantageously be provided that a pin comprises a first and a second scanning point, which interact with a gate and are arranged in succession on the pin in the scanning direction of the gate.

A pin can advantageously comprise a first and a second scanning point, which scan the same surface of a gate (for example the same groove flank or slot flank) in succession in the course of the movement of a switching contact piece. In this case, the scanning points can preferably lie in a common scanning surface of the pin, so that scanning points lying in the scanning surface are arranged in succession in the direction of the movement path of the pin through the gate. It is therefore possible, for example, when providing a curved gate, to align the pin such that it follows the curvature and to thereby counteract the occurrence of an undesired friction loss. In this case, the pin can preferably be designed to be substantially cuboidal, wherein surfaces lying at opposite sides of the cuboid serve as scanning surfaces in order to scan flanks of a gate which are aligned in mutually contrary directions. The spacing of the scanning points can preferably be greater than a width of a gate to be scanned. The width of a gate can be defined for example by the spacing of flanks of a groove or a slot. The pin can preferably be connected to the axially displaceable drive element at a rigid angle. The progression of the gate can therefore be transferred to the drive element in a simple manner. A scanning surface can be divided into a plurality of portions. It is therefore possible, for example, to design the pin in multiple parts so that a first scanning point lies in a first portion of a first part and a second scanning point lies in a second portion of a second part. A multi-part pin is advantageous in that a spacing between the multiple parts can be determined in a variable manner.

A further advantageous embodiment can provide that a gate penetrates a body edge of the guide element in a guiding direction.

The gate can comprise an access in a guiding direction of the body (guide element) which delimits said gate, so that an opening in the gate is formed in the axial direction. It is thus possible to enable the pin to plunge into the gate and force a linear guidance of the displaceable drive element. Simple insertion of the pin into the gate can therefore be performed. A linear movement during which the pin moves into the gate can already be promoted before the pin plunges into the gate.

It may preferably be provided that the gate penetrates an end face of a cylinder, which acts as a guide element delimiting the gate.

An end face of a cylinder can comprise an opening of the gate, which extends substantially perpendicularly to an axial guidance of the drive element. This results in assembly-friendly structures for assembling the switchgear in that it is possible for the pin to move into the gate as a result of an axial displacement of the displaceable drive element. Pre-assembled structures can therefore be used and precise alignment of the gate and pin can be performed.

A further advantageous configuration can provide that a pin can be moved at least partially out of the gate.

A pin can be moved at least partially out of a gate, wherein the movement out of the gate preferably takes place in the direction of the axial guidance of the gate. In particular, it may be provided that, in the energized or de-energized state, but preferably in the de-energized state, the pin exits the gate at least partially so that the pin is accessible outside the gate. Part of the pin can preferably remain in the gate so that a simplified movement or introduction of the pin into the gate is ensured. On the one hand, cleaning and maintenance of the pin and the gate can therefore be performed in a simple manner. On the other, as a result of the pin emerging from the gate, a particular switching position of the mutually relatively movable switching contact pieces can be demonstrated. A de-energizing position of the mutually relatively movable switching contact pieces can be represented by the pin emerging from the switching gate, for example.

It may furthermore be advantageously provided that a plurality of axially displaceable drive elements are each fixed in a movement path in a first gate of a guide element via a first pin, wherein the drive elements are attached to a common cross-arm of the kinematic chain, in particular fixed at a rigid angle.

As a result of coupling a plurality of axially displaceable drive elements, a switchgear can be formed which enables multi-pole switching, for example. Therefore, for alternating voltage systems for example, a plurality of required switching poles can be actuated in a synchronized manner. By way of example, a cross-arm, which extends substantially transversely to the axial displacement axis of the drive elements, can realize the mutual coupling and spacing of the drive elements. The drive elements can preferably be aligned parallel to one another and displaced parallel to one another. In this case, each of the drive elements is guided by a separate first pin and a separate first gate. In conjunction with the mutually coupled drive elements, additional stabilization of the individual drive elements can take place by means of their pins and the respective gates. To couple the drive elements, a pivotally movable or rotationally movable attachment of the drive element and cross-arm can be provided, for example. However, the drive elements should preferably be connected to one another at a rigid angle via the cross-arm so that a parallel guidance of the individual drive elements is enabled. This is particularly advantageous if the displaceable drive element is part of a fluid-tight barrier. The drive element can therefore be connected to an elastically deformable wall portion, for example. A particular movement profile can be defined via the gate and the pin, as a consequence of which a particular elastic deformation of the elastically deformable wall is generated. The service life of the fluid-tight wall can thus be increased.

It may furthermore be provided that a sliding guide is arranged on the drive element, which sliding guide is supported on the body comprising the gate.

In addition to the guidance of the drive element by a pin, a sliding guide can be provided in order to guide the drive element for example linearly. By way of example, the drive element can be developed in the manner of a piston, which is guided on/in a cylinder. A pin can then be aligned for example radially with respect to the stroke of the piston and thus realize rotation prevention of the piston or a positive guidance of the piston.

Hereinafter, an exemplary embodiment of the invention is shown schematically in a drawing and described in more detail below.

DETAILED DESCRIPTION OF THE INVENTION

Figure 1:
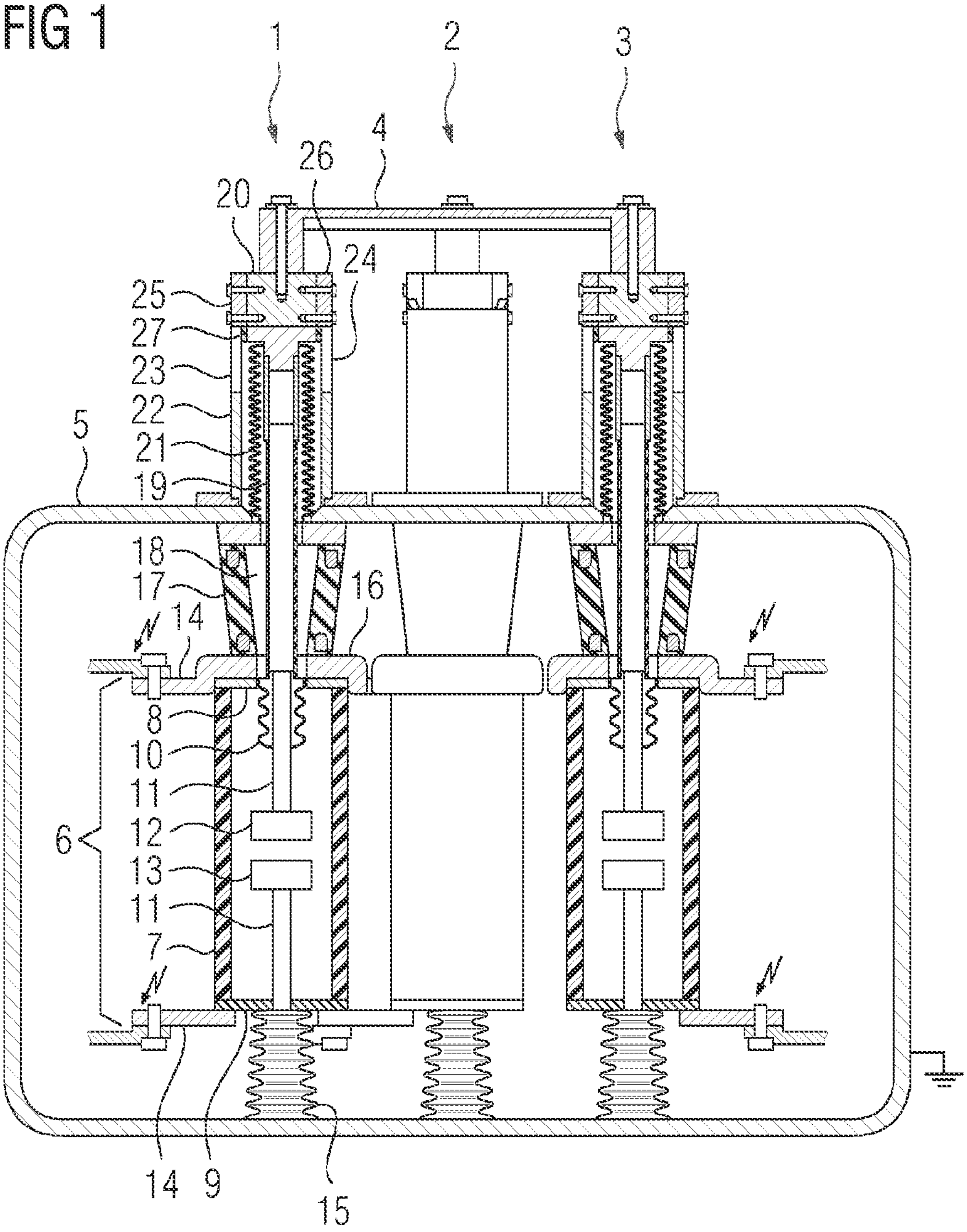
FIG. 1 shows a section through a switchgear.
Figure 4:
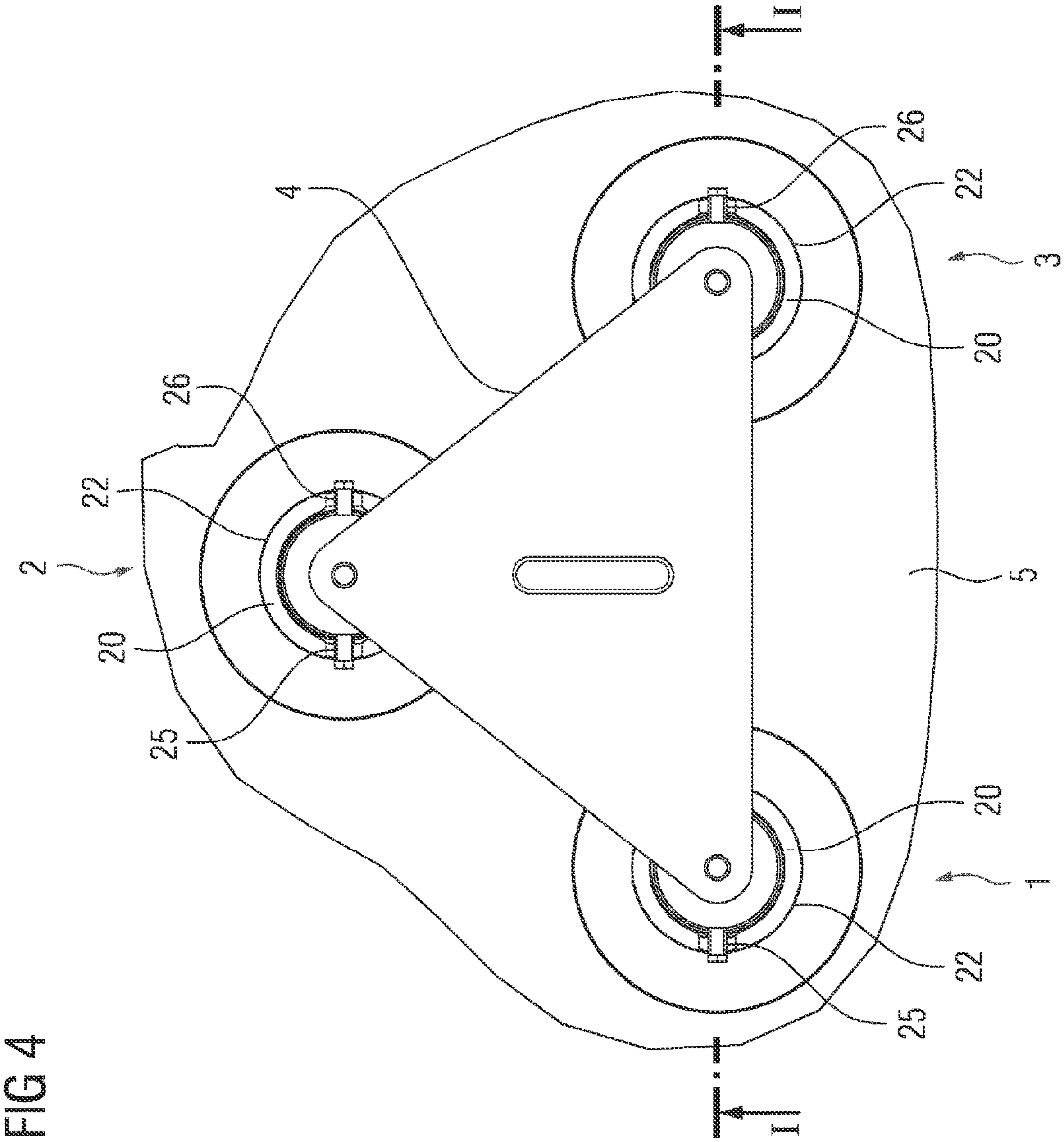
FIG. 4 shows a plan view of the switchgear known from FIG. 1.

The switchgear shown in FIG. 1 comprises a first switching pole 1, a second switching pole 2 and a third switching pole 3. Accordingly, this relates to a switchgear in a multi-pole design. In this case, the three switching poles 1, 2, 3 are constructed in a substantially similar manner and are aligned parallel to one another with respect to their longitudinal axes, which extend in the plane of the drawing in FIG. 1. The second switching pole 2 is offset from the plane in which the longitudinal axes of the first switching pole 1 and the third switching pole 3 are arranged. In a plan view (c.f. FIG. 4), an arrangement of the longitudinal axes of the switching poles 1, 2, 3 in the corner points of a triangle is realized.

By means of a switchgear which comprises a plurality of switching poles 1, 2, 3, it is possible to switch a multi-phase electrical energy transfer system, in this case a three-phase electrical energy transfer system. In the present case, the switching paths of the individual switching poles 1, 2, 3 of the switchgear are actuated in a mutually synchronized manner. To this end, a so-called cross-arm 4 is provided, which is formed as part of a kinematic chain. Via the cross-arm 4, a movement can be coupled and distributed to mutually relatively movable switching contact pieces of the switching pole 1, 2, 3.

In the present case, the switchgear is formed as a fluid-insulated switchgear, that is to say the switching poles extend at least partially into a hermetically enclosing encapsulation housing 5. The encapsulation housing 5 here is formed as an electrically conductive housing, which conducts ground potential. An electrically insulating fluid, for example a fluorine-containing fluid or a nitrogen-containing fluid, is arranged in the interior of the encapsulation housing 5 and forms an electrically insulating atmosphere in the interior of the encapsulation housing 5. The electrically insulating fluid is subject to overpressure.

By way of example, the construction of the first switching pole 1 shall be described in detail below. The second and the third switching pole 2, 3 are constructed in a similar manner to the first switching pole 1. The first switching pole 1 comprises a vacuum switching tube 6. The vacuum switching tube 6 is completely surrounded by the encapsulation housing 5. The vacuum switching tube 6 comprises an electrically insulating tube body 7. In this case, the electrically insulating tube body 7 is aligned substantially coaxially to the longitudinal axis of the first switching pole 1. The tube body 7 is closed in a fluid-tight manner at its end faces by a first closure plate 8 and a second closure plate 9. An elastically deformable wall portion 10 in the form of a bellows is inserted into the first closure plate 8. In this case, the bellows 10 is connected to the first closure plate 8 in a fluid-tight manner on the one hand and seals a cutout there in the first closure plate 8. A shaft 11 passes through the cutout in the first closure plate 8. The shaft 11 furthermore passes through the bellows 10, wherein a fluid-tight bond with respect to the bellows 10 is provided on the side of the bellows 10 which is remote from the first closure plate 8. The shaft 11 is therefore inserted into the first closure plate 8 in a fluid-tight manner and can thus be moved axially in the direction of the longitudinal axis of the first switching pole 1. A shaft 11 likewise passes through the second closure plate 9. The shaft 11 is inserted into the second closure plate 9 at a rigid angle and in a fluid-tight manner. A first switching contact piece 12 and a second switching contact piece 13 are arranged at the mutually facing ends of the mutually coaxially aligned shafts 11. A stationary second switching contact piece 13 is formed owing to the angularly rigid bonding of the second switching contact piece 13 to the associated shaft 11. A movable first switching connection piece 12 is formed in the vacuum switching tube 6 owing to the angularly rigid connection of the first switching contact piece 12 to the movable shaft 11. Routing of a current path from the switching contact pieces 12, 13 arranged within the vacuum switching tube 6 and through the first and second closure plate 8, 9 enclosing the vacuum switching tube in a fluid-tight manner at the end face is realized via the shafts 11. Outside the vacuum switching tube 6, electrical contacting of the shafts 11 is provided in each case by a connection lug 14 to enable the integration of the switching path formed between the switching contact pieces 12, 13 in a current path. The manner of the electrical contacting of the connection lug by the shafts 11 is not illustrated explicitly in FIG. 1. To this end, depending on requirements, a flexible line conductor, a sliding contact arrangement or an angularly rigid connection, in particular to the shaft 11 of the second switching contact piece 13, can be provided, for example.

The electrically insulating fluid flows around the outside of vacuum switching tube 6. The outer surface, in particular between the closure plates 8, 9, is thus electrically insulated. A vacuum exists in the interior of the vacuum switching tube 6 so that the switching path located between the switching contact pieces 12, 13 is insulated by means of a vacuum.

For mechanical bracing of the vacuum switching tube 6, mechanical support of the vacuum switching tube 6 with respect to an inner wall of the encapsulation housing 5 is provided on the side of the second closure plate 9 via a supporting insulator 15. In this case, the vacuum switching tube 6 is braced against the supporting insulator 15 in the direction of the longitudinal axis of the first switching pole 1. To this end, the end face of the vacuum switching tube 6, which comprises the first closure plate 8, is spanned by an electrically conductive armature body 16. In this case, the armature body 16 serves for dielectric shielding of the end face of the vacuum switching tube 6 on which the first closure plate 8 is arranged. A frustoconical insulator 17 is arranged between an inner wall of the encapsulation housing 5 and the electrically conductive armature body 16. At the end face, field control electrodes are incorporated in the frustoconical insulator 17, via which a mechanical bracing of the frustoconical insulator 17 to the electrically conductive armature body 16 or to an inner wall of the encapsulation housing 5 can be performed. The frustoconical insulator 17 comprises a channel 18.

An electrically insulating switching rod 19 passes through the channel 18. The switching rod 19 is connected to the shaft 11 of the first switching contact piece 12 so that an axial movement can be transferred to the shaft 11 of the first switching contact piece 12 via the switching rod 19. In the present case, the switching rod 19 is formed as a substantially hollow cylindrical switching rod 19. The switching rod 19 is connected to the shaft 11 of the first switching contact piece 12 at the end face by its end which faces the shaft 11. The switching rod 11 is connected to a drive element 20 by its end which is remote from the shaft 11. The drive element 20 provides a fluid-tight wall, which extends substantially perpendicularly to the movement axis of the switching rod 19. The switching rod 19 is encompassed by a further bellows 21, wherein the further bellows 21 is connected to the drive element 20 in a fluid-tight manner by a first end, and connected to a wall of the encapsulation housing 5 in a fluid-tight manner by a second element. A pocket-like protuberance is therefore provided on the encapsulation housing 5 via the further bellows, which protuberance is deformable in the axial direction. The electrically insulating fluid enclosed in the interior of the encapsulation housing 5 therefore flows through and surrounds the switching rod 19 completely. The further bellows 21 and the drive element 20 are part of a fluid-tight barrier of the encapsulation housing 5.

The drive element 20 is coupled to the cross-arm 4 at a rigid angle, so that the drive element 20, as part of a kinematic chain, absorbs a movement transferred by the cross-arm 4 and transfers it to the switching rod 19. A mutual relative axial movement of the switching contact pieces 12, 13 is therefore enabled, wherein electrical insulation with respect to the encapsulation housing 5 is realized owing to the electrically insulating effect of the switching rod 19.

Figure 2:
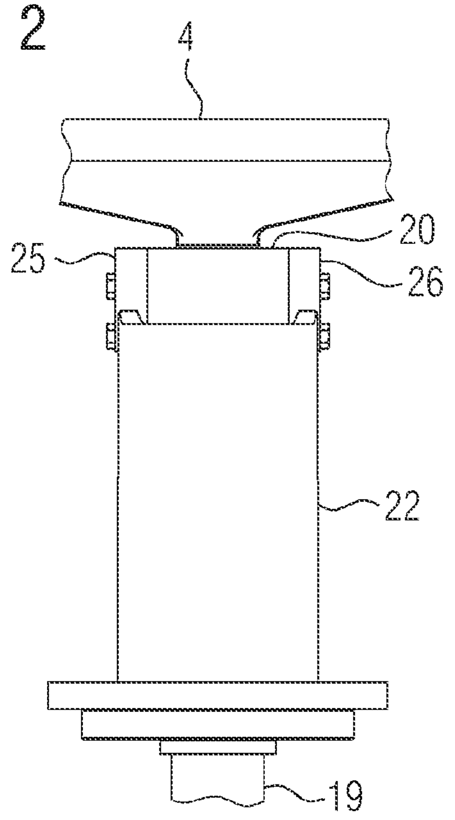
FIG. 2 shows an external view of a guide element of the switchgear known from FIG. 1.
Figure 3:
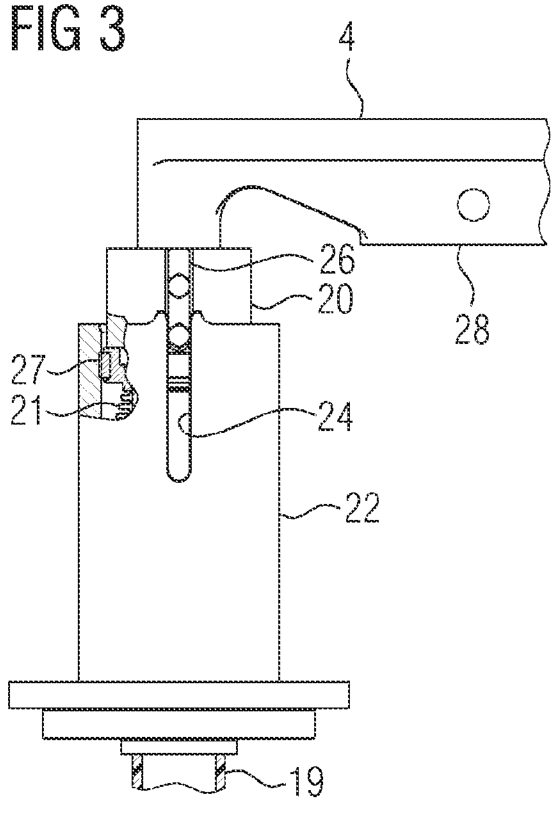
FIG. 3 shows an external view of the switchgear known from FIG. 1 from an alternative axial view.

A guide element 22 is provided to support a movement of the drive element 20 and the cross-arm 4. In the present case, the guide element 22 is connected to the encapsulation housing 5 at a rigid angle, wherein it is provided here that the guide element 22 is arranged outside the electrically insulating fluid enclosed by the encapsulation housing 5. In the present case, the guide element 22 has a substantially hollow cylindrical structure, wherein the drive element 20 is designed with a complementary form to the cutout of the hollow cylindrical guide element 22. Accordingly, an axial movability of the drive element 20 in the direction of the longitudinal axis of the first switching pole 1 is supported by the guide element 22. To prevent tilting and therefore premature aging of the device, the guide element 22 is equipped with a first gate 23 and a second gate 24. A first pin 25 is guided in the first gate, a second pin 26 is guided in the second gate 24. The first and the second pin 25, 26 are connected to the drive element 20 at a rigid angle, and more specifically such that they are arranged diametrically opposed on the circumference of the drive element 20. In the de-energized state of the electrical switchgear (c.f. FIGS. 1, 2 and 3), the pins 25, 26 each project partially into the associated gate 23, 24. The first pin 25 and the second pin 26 are therefore accessible for inspection, for example. Furthermore, the switching position of the switching contact pieces 12, 13 in the interior of the electrical switchgear can be represented by the position of the pin 25, 26.

The two gates 23, 24 each have a similar structure. They are arranged diametrically opposed and are aligned parallel in the direction of the longitudinal axis. In the present case, the two gates 23, 24 are arranged as continuous cutouts (slots) in the wall of the guide element 22. In this case, the position is selected such that the two gates 22, 24 are aligned diametrically opposed, wherein the slots of the first and second gate 23, 24 penetrate an end face of the guide element 22 (c.f. FIG. 2, FIG. 3), whereby an at least partial emergence of the first or second pin 25, 26 from the first or second gate 23, 24 is possible. In this case, the two pins 25, 26 have a substantially cuboidal form, wherein contact surfaces come into contact with sides of the first and second gate 23, 24 which have an opposing alignment. Contact points are thus created in each of the contact surfaces of the first and second pin 25, 26, which contact points are arranged at a spacing in the direction of the progression of the gate. The contact points preferably have a larger spacing in the contact surface of the respective pin 25, 26 than the width of the gate 23, 24. The pins 25, 26 can also have a multi-part structure. A stabilized linear guidance of the drive device 20 and therefore the first switching contact piece 12 is therefore realized via the pins 25, 26 over the course of the two gates 23, 24.

In the view of FIG. 3, in which the side view of the guide element 22, as known from FIG. 2, is illustrated such that it is rotated through 90° about the longitudinal axis of the first switching pole 1, it can be seen in a cut-away portion that a guide ring 27 (piston ring) is arranged to reduce the friction on the drive element 20. The friction between the drive element 20 and the guide element 22 can be reduced via the guide ring 27. It can furthermore be seen in FIG. 3 that, in the de-energized state, the pins 25, 26 (in this case the second pin 26) have emerged partially from the gate 23, 24 (in this case the second gate 24). To this end, the gate (in this case the second gate 24) is incorporated in the manner of a slot in the lateral surface such that it penetrates this latter in the direction of the longitudinal axis of the first switching gate 1 or in the direction of the hollow cylinder axis of the hollow cylindrical guide element 22. Access to the respective gate 23, 24 is possible at the end face. Upon an energizing movement, the drive element 20 plunges into the guide element 22, wherein the pins 25, 26 are inserted completely into the respective gate 23, 24. As the drive element 20 plunges more deeply into the guide element 22, the stabilizing effect of the pins 25, 26 increases since the spacing of the contact points of the respective pin 25, 26 now increases, whereby it becomes more difficult for the pin 25, 26 to tilt in the first or second gate 23, 24, To improve the guidance of the guide element 22, a cross-sectional widening is provided in the opening region of the gate 23, 24. A funnel-shaped inlet into the first and second gate 23, 24 is therefore enabled. A tilting of the drive element 20 or the pins 25, 26 which are connected at a rigid angle can thus be overcome, for example, and a parallel guidance of the pins 25, 26 in the gates 23, 24 can be performed. To this end, it is provided in the present case that, in the opening region of the gates 23, 24, a respective accompanying collar is arranged on the end face of the guide element 22.

A plan view of the switching poles 1, 2, 3 of the switchgear is illustrated in FIG. 4. The trapezoidal configuration of the cross-arm 4 can be seen, which comprises a coupling of the respective drive elements 20 of the three switching poles 1, 2, 3 at its respective corner points. Arranged centrally on the cross-arm 4 is a link 28 via which a connecting rod can be coupled in a pivotally movable manner, for example, in order to enable a linear movement to act on the cross-arm 4 or the kinematic chain of the switchgear by means of a connecting rod, for example.

The invention claimed is:

1. A switchgear, comprising:

a first switching contact piece movably mounted relative to a second switching contact piece;

a kinematic chain for moving said first switching contact piece relative to said second switching contact piece, said kinematic chain including an axially displaceable drive element arranged as a piston guided on a guide element configured as a cylinder, said drive element and said guide element configured to be mutually relatively displaceable;

said guide element being formed with a first gate; and a first pin in said first gate of said guide element determining a movement path of said drive element.

2. The switchgear according to claim 1, further comprising a second pin and a second gate disposed diametrically opposite said first pin and said first gate with respect to said drive element.

3. The switchgear according to claim 2, wherein said first and second pins include a first and a second scanning point, which interact with a respective one of said first and second gates and which are arranged in succession on a respective pin of said first and second pins in a scanning direction of said gate.

4. The switchgear according to claim 2, wherein said first and second gates penetrate a body edge of said guide element in a guiding direction.

5. The switchgear according to claim 2, wherein said first and second gates penetrate an end face of the cylinder, which acts as said guide element delimiting said first and second gate.

6. The switchgear according to claim 2, wherein said first and second pins are at least partially movable out of a respectively associated said first and second gates.

7. The switchgear according to claim 1, wherein said first pin has two second scanning points, which interact with said first gate and which are arranged in succession on said first pin in a scanning direction of said first gate.

8. The switchgear according to claim 1, wherein said first gate penetrates a body edge of said guide element in a guiding direction.

9. The switchgear according to claim 1, wherein said first gate penetrates an end face of the cylinder, which acts as said guide element delimiting said first gate.

10. The switchgear according to claim 1, wherein said first pin is at least partially movable out of said first gate.

11. The switchgear according to claim 1, further comprising a sliding guide arranged on said drive element and configured to support said guide element.

12. A switchgear, comprising:

a plurality of switching poles, each switching pole comprising:

a first switching contact piece movably mounted relative to a second switching contact piece;

a kinematic chain for moving said first switching contact piece relative to said second switching contact piece, said kinematic chain including an axially displaceable drive element guided at a guide element;

said guide element being formed with a first gate;

a first pin in said first gate of said guide element determining a movement path of said drive element; and each axially displaceable drive element of a respective switching pole of said plurality of switching poles being fixed in a movement path in the respective first gate of the respective guide element via the respective first pin, wherein said axially displaceable drive elements of said plurality of switching poles are attached to a common cross-arm of said kinematic chains.

13. The switchgear according to claim 8, wherein said axially displaceable drive elements are attached to said common cross-arm and fixed at a rigid angle.

* * * * *